United States Patent Office 2,934,534
Patented Apr. 26, 1960

2,934,534

PHENYLALKANOL DERIVATIVES

Henri Morren, Forest-Brussels, Belgium, assignor to Union Chimique Belge, S.A., Brussels, Belgium, a corporation of Belgium No Drawing. Application December 23, 1957
Serial No. 704,298

Claims priority, application Belgium January 21, 1957

12 Claims. (Cl. 260—247.5)

The present invention relates to new nitrogenous derivatives of phenylalkanols of the general formula

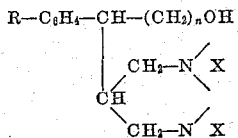
(I)

wherein

R is a hydrogen atom or a methyl group,
$n$ is an integer from 1 to 3, $-N\begin{matrix}\diagup\\\diagdown\end{matrix}X$ represents an aliphatic or heterocyclic secondary amine residue.

The invention also concerns the preparation of these products and of their salts.

These products have interesting pharmacological properties, notably marked ataraxic properties. In addition, clinical observations show that they produce no unpleasant secondary effects, such as drowsiness.

The results of comparative pharmacological tests made with the four products

A. 1-p-chlorobenzhydryl-4-[2-(2-hydroxyethoxy)-ethyl] piperazine
B. 2-phenyl-3-diethylaminomethyl-4 - diethylamino - butanol-1,
C. 2-phenyl-3-(N-morpholino)-methyl - 4 - (N - morpholino)-butanol-1
D. 3-phenyl-4-dimethylaminomethyl - 5 - dimethylaminopentanol-1 are reproduced in the table given below.

The figures given for the ataraxic activity er os represent the activity of the products, taking as a basis the figure of 100 for the product A. The figures given for the secondary effects represent the percentage of cases in which drowsiness has been clinically observed. The toxicity per os L.D. 30 represents the number of milligrams per kilogram of animal which kill 30% of the animals subjected to the tests.

| Products | A | B | C | D |
|---|---|---|---|---|
| Ataraxic activity per os | 100 | 100 | 100 | 167 |
| Secondary effects clinically observed (drowsiness), percent | ±25 | nil | nil | nil |
| Toxicity per os L.D. 30 | 800 | 750 | 4,000 | 2,000 |

The products of the invention are prepared by reducing the ethyl esters of the corresponding monocarboxylic acids in accordance with the reaction

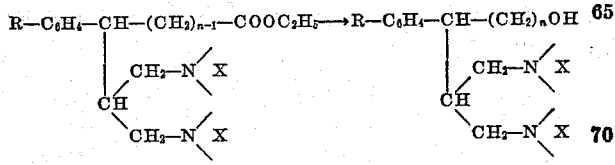

The reduction of the ethyl esters is carried out by one of the methods usually followed for reducing compounds of this type. It is possible to make the reduction using sodium in an alcoholic medium (Bouveault-Blanc reaction), using molecular hydrogen in the presence of copper chromite (Adkins reaction) or using lithium-aluminum hydride.

In the particular case of products of the Formula I in which $n=2$, the preparation is carried out by decyanidation of nitriles of the following structure

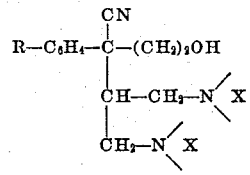

by means of sodium amide in accordance with the reaction

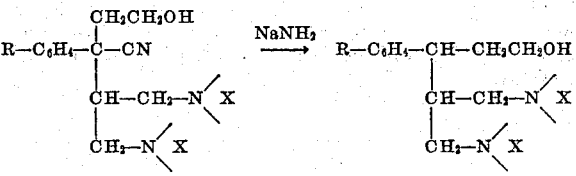

The nitriles are obtained by reacting ethylene oxide with the appropriate nitrile in accordance with the reaction

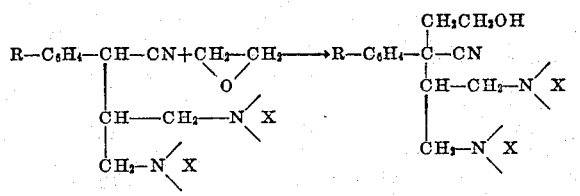

The ethyl esters used in the preparation of the products of the invention are obtained by hydrolysis of the corresponding nitriles, followed by esterification of the acids formed. Thus, the esters used for preparing products of the Formula I, in which $n=1$, are obtained in accordance with the following reactions

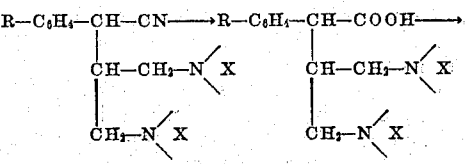

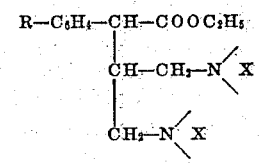

The esters used for the preparation of products of the Formula I in which $n=3$ are obtained in accordance with the following synthesis

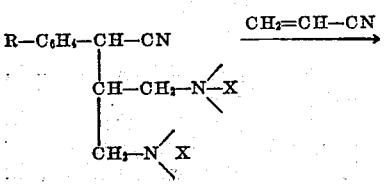

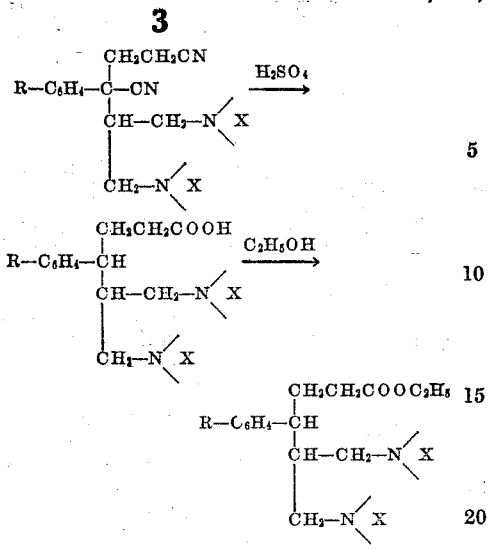

The nitriles used for synthesizing the esters employed as starting products for the preparation of the products of the invention, are obtained by the methods usually followed for the preparation of nitriles. Thus, for example, an R-phenylacetonitrile is treated with 1 molecule of a derivative

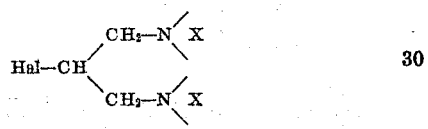

in accordance with the reaction

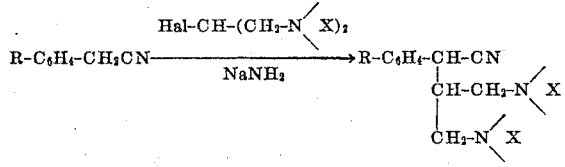

*Example 1.—2-phenyl-3-diethylaminomethyl-4-diethylamino-butanol-1*

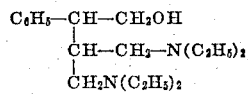

In a nitrogen atmosphere, an ethereal solution of 0.15 mole of ethyl 2-phenyl-3-diethylaminomethyl-4-diethylamino-butyrate is added dropwise with agitation to a suspension of 0.2 mole of lithium-aluminum hydride in 500 cc. of anhydrous ether. The mixture is heated under reflux for 2 hours.

The reaction mixture is cooled and the complex formed is hydrolyzed by addition of an aqueous sodium-potassium tartrate solution. The ethereal solution is decanted, dried over sodium sulphate and the solvent is evaporated off. The residue is distilled under a high vacuum. 2-phenyl-3-diethylaminomethyl-4-diethylamino - butanol - 1 having a boiling point of 135° C./0.05 mm. Hg is obtained in the yield of 95%.

*Example 2.—2-phenyl-3-[(N-morpholino)methyl]-4-(N-morpholino)butanol-1*

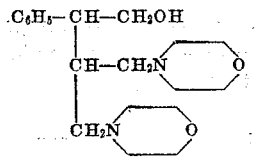

To a suspension of 14 g. of finely divided sodium in 50 cc. of toluene, maintained at about 60° C. is rapidly added a solution of 0.1 mole of ethyl 2-phenyl-3-[(N-morpholino)methyl]-4-(N-morpholino)-butyrate in 130 cc. of absolute ethanol. When the reaction slackens, the mixture is heated under reflux until the sodium is completely dissolved.

The solvent is driven off by steam distillation, the residue is taken up in benzene and the organic solution is washed several times with hot water. The benzenic solution is dried and distilled.

2-phenyl-3-[(N-morpholino)methyl]- 4 - (N-morpholino)-butanol-1 having a boiling point of 198–200° C./0.01 mm. Hg is obtained in a yield of 65%.

*Example 3.—2-phenyl-3-dimethylaminomethyl - 4 - dimethylamino-butanol-1*

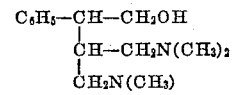

0.5 mole of ethyl 2-phenyl-3-dimethylaminomethyl-4-dimethylamino-butyrate in 100 cc. of ethanol containing 10 g. of copper chromite is heated with agitation in an autoclave at 200° C. for 3 hours under a hydrogen pressure of 200 atmospheres.

The catalyst is separated off in known manner and the solution is fractionated by a distillation in vacuo. 2-phenyl-3-dimethylaminomethyl - 4 - dimethylamino-butanol-1 having a boiling point of 130–132° C./0.1 mm. Hg is obtained in a yield of 90%.

*Example 4.—3-phenyl - 4 - [(N-morpholino)methyl]-5-(N-morpholino)-pentanol-1*

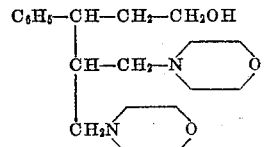

To a suspension of 0.2 mole of sodium amide in 100 cc. of toluene is added a toluenic solution of 0.2 mole of 2-phenyl-3-[(N-morpholino)methyl]-4-(N-morpholino)-butyronitrile, and the mixture is heated under reflux for 1 hour.

The solution is allowed to cool to about 80° C. and 0.2 mole of gaseous ethylene oxide is added in the space of 90 minutes.

The toluenic solution is washed with water and fractionated by distillation. The 3-phenyl-3-cyano-4-[(N-morpholino)-methyl]-5-(N-morpholino) - pentanol-1 is obtained in a yield of 40% (B.P. 234° C./0.02 mm. Hg).

This nitrile is decyanided in xylenic solution by heating for 12 hours with a large excess of sodium amide. After washing with water, the product is distilled and 3-phenyl-4-[(N-morpholino)methyl] - 5 - (N-morpholino)-pentanol-1 having a boiling point of 197° C./0.01 mm. Hg is obtained in a yield of 65%.

Similarly, from 3-phenyl-3-cyano - 4 - dimethylaminomethyl-5-dimethylamino-pentanol-1 (B.P. 180–185° C./0.05 mm. Hg), there is prepared 3-phenyl-4-dimethylaminomethyl-5-dimethylamino-pentanol having the following formula

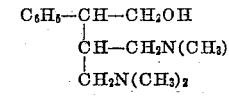

B.P. 134–136° C./0.02 mm. Hg.

*Example 5*

The following products were obtained by reduction of the corresponding esters by one of the methods of Examples 1 to 3.

2-phenyl-3-dipropylaminomethyl - 4 - dipropylamino-butanol-1

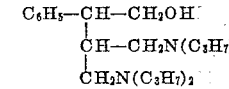

B.P. 151° C./0.1 mm. Hg.

2-phenyl-3-dibutylaminomethyl-4-dibutylamino-butanol-1

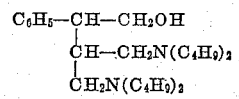

B.P. 163° C./0.01 mm. Hg.

2-phenyl-3-[(N-piperidino)-methyl]-4-(N-piperidino)-butanol-1

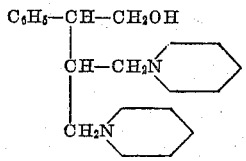

B.P. 176° C./0.4 mm. Hg.

2-o-tolyl-3-[(N-morpholino)methyl]-4-(N-morpholino)-butanol-1

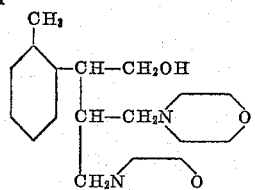

B.P. 210–215° C./0.005 mm. Hg.

4-phenyl-5-[(N-morpholino)methyl]-6-(N-morpholino)-hexanol-1

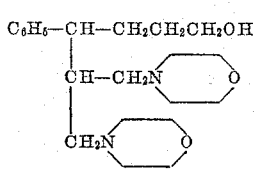

B.P. 187° C./0.01 mm. Hg.

For preparing these products, one of the following new substances may be employed:

Ethyl 2-o-tolyl-3-[(N-morpholino)methyl]-4-(N-morpholino)-butyrate

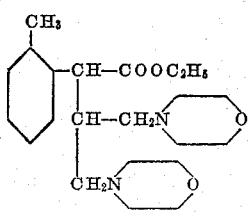

For obtaining this ester, a nitrile is first prepared by reacting 1:3-di(N-morpholino)-2-chloropropane with the monosodium derivative of o-tolylacetonitrile. This nitrile is thereafter hydrolyzed and the acid obtained is esterified by ethanol.

B.P. of the nitrile: 205–210° C./0.01 mm. Hg.
B.P. of the ester: 192–194° C./0.05 mm. Hg.

Ethyl 4-phenyl-5-[(N-morpholino)-methyl]-6-(N-morpholino)hexanoate

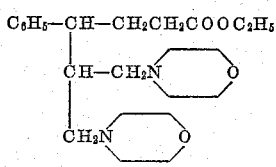

0.3 mole of acrylonitrile is gradually added at about 30° C. to a solution of 0.2 mole of 2-phenyl-3-[(N-morpholino)methyl]-4-(N-morpholino)-butyronitrile in 100 cc. of tertiary butanol containing 1 cc. of a 30% potassium hydroxide solution in methanol, the temperature being maintained at about 30° C. When the reaction slackens, the mixture is heated for 3 hours at 40° C. It is then cooled and taken up in benzene and washed with water, and the solvent is evaporated off. By rectification of the residue in vacuo, 4-phenyl-4-cyano-5-[(N-morpholino)methyl]-6-(N-morpholino)-hexanenitrile is obtained in a yield of 82% (B.P. 237° C./0.03 mm. Hg).

This nitrile is decyanided and hydrolyzed by prolonged heating with a 70% sulphuric acid. The mono-acid formed is esterified with ethanol in the presence of sulphuric acid. Ethyl 4-phenyl-5-[(N-morpholino)methyl]-6-(N-morpholino)-hexanoate is obtained in a yield of 30% (B.P. 189° C./0.03 mm. Hg).

I claim:

1. New diamino derivatives of phenylalkanols selected from the group consisting of compounds having the general formula

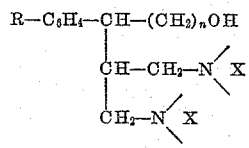

wherein R is a member selected from the group consisting of a hydrogen atom and a methyl radical, $n$ is an integer from 1 to 3 and —N<X is an amine residue selected from the group consisting of dialkylamines with lower alkyl radicals, piperidine and morpholine.

2. As new compound 2-phenyl-3-dimethylaminomethyl-4-dimethylamino-butanol-1.

3. As new compound 2-phenyl-3-diethylaminomethyl-4-diethylamino-butanol-1.

4. As new compound 2-phenyl-3-dibutylaminomethyl-4-dibutyl amino-butanol-1.

5. As new compound 2-phenyl-3-[(N-piperidino)-methyl]-4-(N-piperidino)-butanol-1.

6. As new compound 2-phenyl-3-[(N-morpholino)-methyl]-4-(N-morpholino)-butanol-1.

7. As new compound 3-phenyl-4-[(N-morpholino)-methyl]-5-(N-morpholino)-pentanol-1.

8. As new compound 4-phenyl-5-[(N-morpholino)-methyl]-6-(N-morpholino)-hexanol-1.

9. A process for preparing new diamino derivatives of phenylalkanols selected from the group consisting of compounds having the general formula

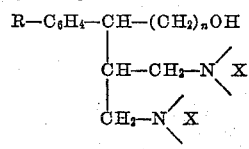

wherein R is selected from the group consisting of a hydrogen atom and a methyl radical, $n$ is an integer from 1 to 3 and —N<X is an amine residue selected from the group consisting of dialkylamines with lower alkyl radicals, piperidine and morpholine, which comprises reducing into the corresponding alcohols ethyl esters of the general formula

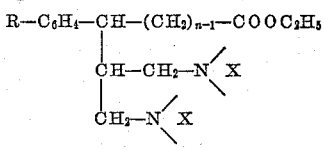

10. A process according to claim 9 wherein the reduction is carried out by means of sodium in alcoholic medium.

11. A process according to claim 9 wherein the reduction is carried out by means of lithium-aluminum hydride.

12. A process according to claim 9 wherein the reduction is carried out by means of molecular hydrogen in the presence of copper chromite.

References Cited in the file of this patent

FOREIGN PATENTS 649,981    Great Britain _____ Feb. 7, 1951